ns Müller, Erlenbach, Zurich, Switzerland
Filed May 25, 1964, Ser. No. 370,071
Claims priority, application Switzerland, May 28, 1963,
6,616/63
16 Claims. (Cl. 210—68)

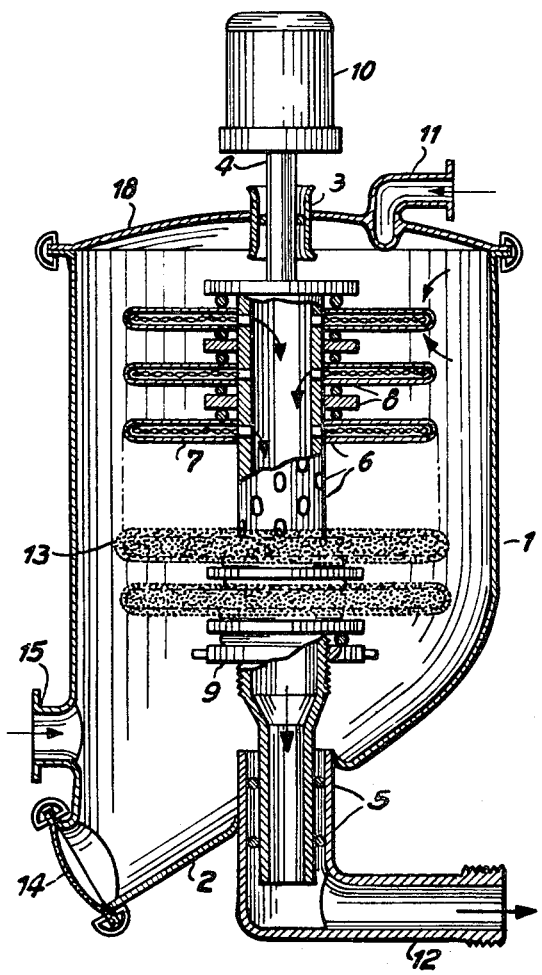

ABSTRACT OF THE DISCLOSURE

A process for drying filter cake formed on a solids-impermeable, liquid-permeable filter element wherein liquid is removed from the interstices of the filter cake by first passing a drying gas at relatively high pressure through the filter cake in the direction toward and through the liquid-permeable filter element, thereby also mechanically blowing out moisture from the filter cake, and whereby the thus partially dried filter cake is further dried by passing drying gas at a lower elevated pressure therethrough, optionally followed by subjecting the filter cake to a partial vacuum.

---

The filters particularly suitable for drying residue in the filter itself are disc filters with horizontal elements which are pervious only on top and on which the filter cake is built up horizontally. Once the filter cake has been built up, the surplus residual liquid (heavy liquid) left in the filter is emptied out and the cake is then dried with a suitable medium such as compressed air or compressed gas. Drying is usually done in such a way that the drying medium used is pressed through the cake in the filtering direction; it may be heated in order to accelerate the drying process.

In practice this drying method has been found to have certain disadvantages if the filtration residue offers strong resistance to the drying medium, so that relatively high pressures are needed to force the gaseous medium through the filter cake. The drying process is accordingly relatively expensive, since in many cases a pressure of up to 4 atmospheres is required.

The invention discloses a method enabling the drying process to be carried out far more cheaply than hitherto. It consists of carrying out the drying process in several stages, by subjecting the residue which has accumulated on the filter surfaces in the course of filtration to high pressure preliminary drying on the filter elements and then to subsequent low pressure drying, again on the filter elements. Thus, in the first drying stage, the moisture in the cake is substantially blown out mechanically. This is done with high pressure air and is continued until a certain fall in pressure on the filter surfaces indicates that a lower pressure can be used.

In many cases the first drying stage can be carried out for a short time, for example, ten to thirty minutes. After this time the differential pressure required to overcome the flow resistance in the cake has dropped to 0.3 to 0.8 atmosphere, so the relatively expensive high pressure air need be used only during this period. After this first stage of drying or blowing out, air or gas from a blower may be used, that is to say the pressure medium used may be one which is far cheaper to produce than the high pressure medium. As the quantities of air required to dry such filtration residue are sometimes very large—the amounts which results in drying vary from 30 to 100 cubic metres per sq. metre of filter surface per hour—a great deal can be saved if the drying process is split up in accordance with the invention.

When the filtration residue has been dried with low pressure air for a certain time, for example 2 to 4 hours, the differential pressure arising in the filter usually drops again markedly so that, further according to the invention, a third drying stage may follow using a still cheaper medium from a normal blower. The third stage brings a further reduction in a cost of drying.

Whereas in the first stage, i.e. the stage using the highest pressure, it is often unnecessary to heat the drying medium, in the second and third stages the drying medium is heated to a temperature which can be tolerated by the product. In the course of drying the filtration residue obviously takes on the temperature of the drying medium.

Such drying processes are known to be asymptotic towards the end of the drying operation, i.e. the more the drying process nears its end, the more slowly does it proceed. In other words, towards the end of the drying process the drying medium (air or gas) is poorly exploited, and a large amount of the heat is used only for heating the residue instead of for the actual drying process.

In drying water-moist residue, for example, the drying process is extremely slow when a moisture content of 3 to 7% is reached. This means that the filtration residue which has to be dried is exposed to the hot drying medium for a long time and may undergo chemical changes, and also that the drying apparatus, which is also the filtering apparatus, is not available for further use for a very long time. The more rapidly drying can be carried out the more economic is the process.

It has been found that the process may also be arranged so that towards the end of the drying operation, i.e. from the point when the drying process becomes asymptotic and slow, the supply of drying medium can be discontinued and the residual moisture can be dried adiabatically, for example, by producing a vacuum in the drying apparatus. If residue is dried by a gaseous medium at 100° C., this means that towards the end of the drying operation the residue may take on a temperature of 50 to 70° C. However, residue at a temperature of 70° C. contains a large amount of heat, sufficient in many cases to dry the 3 to 7% residual moisture adiabatically by producing a vacuum. The residue of course cools off during the adiabatic drying, but in most cases this is an advantage.

During the drying process the filter elements are heated to the temperature of the drying medium, as they are dry. As the elements may be very heavy, sometimes even heavier than the residue itself, they also give out heat during the final adiabatic drying whether by contact with the filter cakes to be dried or by radiation. As a result, more water can be vaporised during the adiabatic drying process than the amount corresponding to the heat contained in the residue. More or less additional liquid can be vaporized, depending on the weight and construction material of the filter elements. In certain cases it is also of advantage to use particularly heavy filter elements with a correspondingly large heat storage capacity. The filter elements then also act as heat reservoirs and are preferably made of material of high specific heat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Brief description of the drawing*

The single figure of the drawing is a cross sectional, elevational view of a filter apparatus suitable for carrying out the method of the present invention.

Referring now to the drawing, it will be seen that the filter apparatus illustrated therein includes a housing 1 which is of substantially cylindrical configuration. The lower portion of this housing is of reduced size and extends to one side of the axis of the housing to form a discharge passage 2 at the bottom of the housing. A cover 18 closes the top of the housing, and this cover 18 carries a bearing 3 for a drive shaft 4. This drive shaft 4 has an elongated hollow portion which is turnably guided adjacent its bottom end by another bearing 5 located at the lower wall of the housing. The bearings 3 and 5 may take the form of suitable sealing glands, rubber rings, or the like so that the interior of the housing is sealed from the exterior thereof. The hollow portion of the shaft 4 is formed in its wall with suitable cutouts 6. A series of filter elements 7 are carried by the shaft 4 for rotation therewith and cooperate through the cutouts 6 with the interior of the shaft 4. In the illustrated example the filter elements 7 are of a substantially flat disk-shape. These filter elements are in the form of hollow disks having walls formed with suitable apertures through which a liquid flows while the particles suspended in the liquid are retained at the exterior of the filter elements. A plurality of sealing rings 8 are located between each pair of successive filter elements 7 so that the hollow shaft 4 can communicate at its interior only with the interior of the filter elements 7. The sealing rings 8 take the form of annular washers or the like located between a pair of rubber rings which respectively engage a pair of successive filter elements as shown. Thus, the sealing rings 8 not only seal the hollow shaft 4, but in addition they serve to space the filter elements at the desired distances from each other. The bottom end portion of the shaft 4 is threaded at its exterior, and a nut 9 is carried by this threaded portion of the shaft 4 and serves to press all of the filter elements 7 and sealing rings 8 together, the shaft 4 being provided at its upper portion, just beneath the bearing 3, with an outwardly extending annular flange against which the topmost sealing ring bears. A motor 10 or other suitable drive means is operatively connected to the upper end of the drive shaft 4 for rotating the latter in a manner described below.

The liquid which is to be filtered flows into the apparatus through a pipe 11 connected to and passing through the cover 18 and having a bottom open end, this pipe 11 communicating with any suitable conduit which leads from any desired source of the liquid to be filtered. The liquid to be filtered fills the housing 1 and surrounds the filter elements 7. The liquid passes through the filter elements into the interior thereof during the filtering process, and then the liquid flows through the cutouts 6 into the hollow shaft 4 whose bottom open end extends into a discharge tube 12. A suitable pump or the like (not shown) communicates with the interior of the tube 12 to draw the filtered liquid therethrough.

When the cakes 13 have attained a predetermined thickness, so that very little or no liquid can flow through the cakes 13 into the filters, then the flow of liquid to be filtered to the pipe 11 is stopped in any suitable way, which may be manual or automatic, and gaseous drying medium is introduced through inlet 15. After drying is completed, as more fully described herein, the shaft 4 may be rotated at a high speed so that the particles which form the cakes 13 are thrown from the filter elements 7 by centrifugal force.

An example will now be given to illustrate the invention. Chemically produced synthetic dye pigments in aqueous suspension are filtered on a horizontal disc filter. Filtering is continued until a cake of 20 to 40 mm. has been built up. The housing is freed from the residual liquid still in it, and the wet cake is then blown out in the filtration direction for 15 to 20 minutes with compressed air at about 3 to 4 atmospheres excess pressure. By this time the differential pressure through the cake of residue, which was initially 3 to 4 atmospheres—the amount of air being from 10 to 30 cubic meters per hour per sq. metre of filtered surface—has dropped to from 0.5 to 0.6 atmosphere. The high pressure air from a compressor installation is now turned off and compressed air from a rotary blower is used in its place. The rotary blowers provide a maximum pressure of, for example, 0.8 atmosphere, but the compressed air is made far more cheaply than air from a high pressure compressor. Air from the blower, which is relatively cheap, can be forced through the cake at high speed. Before entering the filtering apparatus the air is heated to 100 to 150° C. by a heat exchanger. After the residue has been dried in this way for 3 to 5 hours, a sample taken indicates that the cake still contains about 5 to 7% water. It would take a further 2 to 3 hours to dry out the residual moisture with air from the blower so the blower is turned off. The whole apparatus is put under a vaccum and the remainder of the drying process takes place adiabatically or even with cooling. After half an hour the cake is found to have lost substantially all its moisture, i.e. its moisture content is only from 0.1 to 0.3%.

The final, adiabatic drying process has the advantage of doing less damage to the product than would drying by supplying heat from the outside.

Although in most cases air is used as the drying medium it could, as already mentioned, be replaced by nitrogen or another gas. Superheated water vapour circulating through the filter cake may also be used instead of air. It is led back to the housing and reheated, and the high pressure formed is blown off through a spill valve. Even if super-heated water vapour is used for drying, it is an advantage to proceed in different stages and to carry out the last stage in vacuo i.e. adiabatically. When the product has been dried it is centrifuged off the filter surfaces by rotating the bundle of filters and can be removed from the bottom of the appaartus completely dry.

It is to be understood that the term "high pressure" means in general a pressure in excess of 2 atmospheres gauge, particularly 3–5 atmospheres gauge; that the term "lower pressure" means in general about 0.5 to 1 atmosphere gauge, and the term "pressure substantially less than atmospheric" means in general less than about 0.5 atmosphere absolute.

Modifications of the invention as particularly described will be apparent to those familiar with the art of filtering, and it is intended that the invention should not be limited by the particular description above, but only by the appended claims.

I claim:

1. A filtering process, comprising the steps of filtering a suspension of solid particles in a liquid through a liquid permeable, solid particles-impermeable filter element so as to form on said filter element a solid filter cake consisting essentially of a mass of said solid particles formed with interstices, and of liquid at least partially filling said interstices; passing through said filter cake and through said liquid-permeable filter element in the direction from said filter cake towards said filter element at a relatively high pressure a drying gas so as to remove from said interstices of said filter cake and to carry along with said gas through said filter element a portion of the liquid content of said filter cake thereby partially drying the latter and reducing the resistance thereof against the passage of gas therethrough, and thereafter passing in said direction through the thus partially dried filter cake, while the same remains on said filter element, a drying gas at a lower elevated pressure so as to withdraw residual moisture from said partially dried filter cake.

2. A filtering process as defined in claim 1, wherein said relatively high pressure is in excess of 3 atmospheres absolute pressure, and said lower elevated pressure is up to about 2 atmospheres absolute pressure.

3. A filtering process as defined in claim 2, wherein said relatively high pressure is between about 4 and 6 atmospheres absolute pressure, and said lower elevated pressure is between about 1.5 and 2 atmospheres absolute pressure.

4. A filtering process as defined in claim 1, wherein said passing of drying gas at relatively high pressure through said filter cake is continued until the moisture content of said filter cake is reduced to between about 3 and 7%.

5. A filtering process as defined in claim 1, wherein after passing drying gas at lower pressure through said filter cake, the latter is subjected to a partial vacuum.

6. A filtering process as defined in claim 5, wherein said partial vacuum is equal to an absolute pressure of less than 0.5 atmosphere.

7. A filtering process as defined in claim 5, wherein said gas passed through said filter cake at a relatively high pressure, and the atmosphere in contact with said filter cake while the same is subjected to a partial vacuum are at substantially ambient temperature, and said gas being passed through said filter cake at said lower elevated pressure is at an elevated temperature.

8. A filtering process as defined in claim 5, wherein said gas passed through said filter cake at an elevated higher pressure and the atmosphere in contact with said filter cake while the same is subjected to a partial vacuum are at substantially ambient temperature, and said gas being passed through said filter cake at said lower elevated pressure is passed through said filter cake in two stages the first of which is carried out at a higher pressure than the second, and the gas passed through the filter cake in both stages is at an elevated temperature.

9. A filtering process as defined in claim 1, wherein said passing of drying gas at lower pressure through said filter cake comprises two stages, the first of which is carried out at higher pressure than the second.

10. A filtering process as defined in claim 1, wherein said drying gas being passed at said lower pressure through said filter cake is at an elevated temperature.

11. A filtering process as defined in claim 1, wherein said liquid is water, and wherein said filter cake is subjected to a partial vacuum after the water content of the partially dried filter cake has been reduced to between about 3 and 7%.

12. A filtering process as defined in claim 1, wherein the passage of drying gas through said filter cake at a relatively high pressure is carried out at an absolute pressure of between about 3 and 6 atmospheres for a period of between about 15 and 20 minutes, the passage of gas through said filter cake at a lower elevated pressure is carried out at an elevated gas temperature and at an absolute pressure of about 1.8 atmospheres for a period of between 3 and 5 hours, and thereafter, the thus partially dried filter cake is subjected at ambient temperature to a partial vacuum.

13. A filtering process as defined in claim 1, wherein in the first drying stage drying gas is passed through said filter cake at an absolute pressure of between about 3 and 6 atmospheres until the major portion of liquid is removed from the interstices of the cake, in a second drying stage hot drying gas is passed through the filter cake at an absolute pressure of about 1.8 atmospheres, the temperature of said hot gas being between 50 and 150° C. until the liquid content of said cake has been reduced to between about 5 and 7%, and in a third stage, the thus predried cake is further dried by being subjected to a partial vacuum.

14. A filtering process as defined in claim 13, wherein said liquid is water.

15. A filtering process as defined in claim 1, wherein said drying gas is air.

16. A filtering process as defined in claim 1, wherein said drying gas is superheated steam.

References Cited
UNITED STATES PATENTS

| | | | |
|---|---|---|---|
| 1,544,796 | 7/1925 | Bean et al. | 34—15 |
| 2,329,600 | 9/1943 | Freund | 34—15 |
| 3,143,497 | 8/1964 | Fuehring | 210—68 X |
| 3,190,449 | 6/1965 | Muller | 210—68 X |
| 3,213,547 | 10/1965 | Trettel | 34—15 |

SAMIH N. ZAHARNA, *Primary Examiner.*